US011235774B2

(12) United States Patent
Cheng et al.

(10) Patent No.: US 11,235,774 B2
(45) Date of Patent: Feb. 1, 2022

(54) ROAD CONDITION PREDICTING METHOD AND APPARATUS, COMPUTER DEVICE AND READABLE MEDIUM

(71) Applicant: BAIDU ONLINE NETWORK TECHNOLOGY (BEIJING) CO., LTD., Haidian District Beijing (CN)

(72) Inventors: Xingyi Cheng, Haidian District Beijing (CN); Jie Zhou, Haidian District Beijing (CN); Ruiqing Zhang, Haidian District Beijing (CN); Wei Xu, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 954 days.

(21) Appl. No.: 15/956,155

(22) Filed: Apr. 18, 2018

(65) Prior Publication Data
US 2018/0304899 A1    Oct. 25, 2018

(30) Foreign Application Priority Data
Apr. 20, 2017    (CN) .......................... 201710260079.5

(51) Int. Cl.
*B60W 40/06*    (2012.01)
*G06N 5/04*    (2006.01)
(Continued)

(52) U.S. Cl.
CPC ........... *B60W 40/06* (2013.01); *G06N 3/0445* (2013.01); *G06N 3/0454* (2013.01); *G06N 5/022* (2013.01);
(Continued)

(58) Field of Classification Search
CPC .............................. B60W 40/04; B60W 40/06
See application file for complete search history.

(56) References Cited

U.S. PATENT DOCUMENTS 8,606,727 B2 * 12/2013 Wu ....................... G08G 1/0104
706/12
2008/0071465 A1 * 3/2008 Chapman ........... G01C 21/3691
701/117
(Continued)

FOREIGN PATENT DOCUMENTS

CN    102110365 A    6/2011
CN    105389980 A    3/2016
(Continued)

OTHER PUBLICATIONS

Lukas Wiest, "Recurrent Neural Networks—Combination of RNN and CNN", Feb. 2017 (Year: 2017).*
(Continued)

*Primary Examiner* — Aniss Chad
*Assistant Examiner* — Stephanie T Su
(74) *Attorney, Agent, or Firm* — Lando & Anastasi, LLP

(57) ABSTRACT

A road condition predicting method and apparatus, a computer device and a readable medium. The method comprises: obtaining N-order neighboring roads of a target road in a road network and obtaining feature information of the target road at a current time instant and feature information of N-order neighboring roads of the target road. The feature information including road conditions at the current and at at least one historical time; predicting road conditions of the target road at a preset future time according to the feature information of the target road at the current time, the feature information of the N-order neighboring roads and a pre-trained road condition predicting model. Reference is made to spatial information of the target road, namely, and to the road condition of the N-order neighboring roads of the target road at the current time instant and the road conditions at at least one historical time instant.

15 Claims, 7 Drawing Sheets

(51) Int. Cl.
*G06N 5/02* (2006.01)
*G06N 3/04* (2006.01)
*G08G 1/01* (2006.01)
*G01C 21/32* (2006.01)

(52) U.S. Cl.
CPC ........... *G06N 5/046* (2013.01); *G08G 1/0129* (2013.01); *B60W 2552/00* (2020.02); *B60W 2555/60* (2020.02); *G01C 21/32* (2013.01)

(56) References Cited

U.S. PATENT DOCUMENTS

| | | | |
|---|---|---|---|
| 2008/0319639 | A1 | 12/2008 | Yamane |
| 2014/0058652 | A1 | 2/2014 | Duan et al. |

FOREIGN PATENT DOCUMENTS

| | | | | |
|---|---|---|---|---|
| CN | 105654729 | A | * | 6/2016 |
| CN | 105654729 | A | | 6/2016 |
| CN | 105788249 | A | | 7/2016 |
| CN | 106205126 | A | | 12/2016 |
| CN | 106447119 | A | | 2/2017 |

OTHER PUBLICATIONS

Wu; Yuankai, Short-term traffic flow forecasting with spatial-temporal correlation in a hybrid deep learning framework, Dec. 2016 (Year: 2016).*
Chinese Search Report from corresponding Chinese Application No. 2017102600795 dated Oct. 25, 2019.
First Chinese Office Action from corresponding Chinese Application No. 2017102600795 dated Oct. 25, 2019.
Chinese Search Report from corresponding Chinese Application No. 201710260079.5 dated Dec. 4, 2020.
First Chinese Office Action from corresponding Chinese Application No. 201710260079.5 dated Dec. 4, 2020.
Florian Toque et al., Forecasting Dynamic Public Transport Origin-Destination Matrices with Long-Short Term Memory Recurrent Neutral Networks, 2016 IEEE 19th International Conference on Intelligent Transportation Systems (ITSC), Windsor Oceanico Hotel, Rio de Janeiro, Brazil, Nov. 1-4, 2016, pp. 1017-10176.
Xiaosi Zeng et al., Development of Recurrent Neural Network Considering Temporal-Spatial Input Dynamics for Freeway Travel Time Modeling, Computer-Aided Civil and Infrastructure Engineering 28 (2013), pp. 359-371.
Yang, Zhen-ming et al., Multistep-Ahead independent Prediction of Nonlinear TimeSeries Based on Independent Model, Journal of Shanghai JIAO Tong University, vol. 47, No. 10, Oct. 2013, pp. 1626-1631.

* cited by examiner

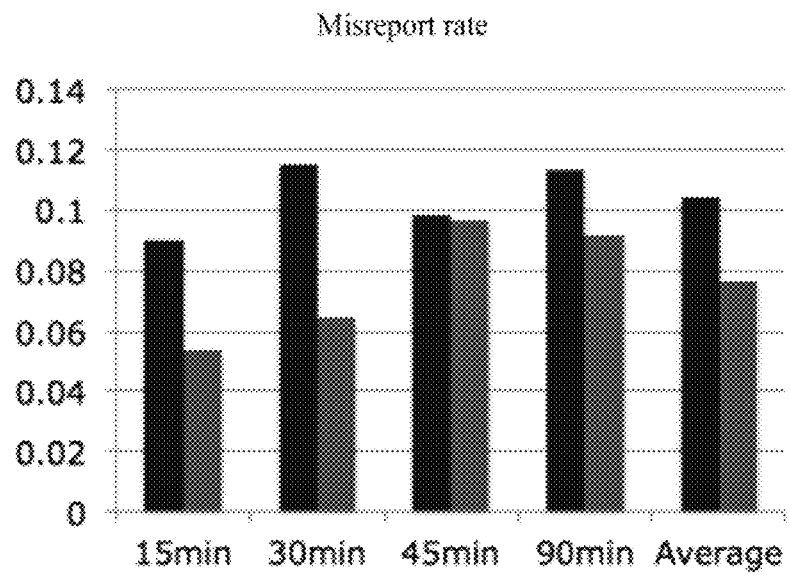
Fig. 7
|  | baseline | our model |
|---|---|---|
| 15min | 0.0898 | 0.0542 |
| 30min | 0.1152 | 0.0644 |
| 45min | 0.0983 | 0.0966 |
| 90min | 0.1135 | 0.0915 |
| Average | 0.1042 | 0.0766 |
Fig. 8
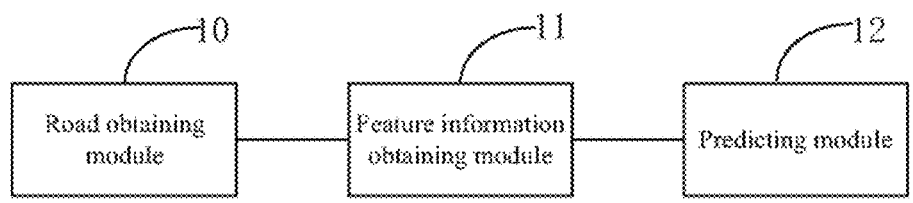
Fig. 9

ROAD CONDITION PREDICTING METHOD AND APPARATUS, COMPUTER DEVICE AND READABLE MEDIUM

The present application claims the priority of Chinese Patent Application No. 2017102600795, filed on Apr. 20, 2017, with the title of "Road condition predicting method and apparatus, computer device and readable medium". The disclosure of the above applications is incorporated herein by reference in its entirety.

FIELD OF THE DISCLOSURE

The present disclosure relates to the technical field of computer application, and particularly to a road condition predicting method and apparatus, a computer device and a readable medium.

BACKGROUND OF THE DISCLOSURE

As science and technology develops, more and more applications (APPs) springs up and are used on a mobile terminal, and greatly facilitate people's life.

For example, as various navigation APPs used on the mobile terminal arise, people may not only query for a path to a destination at any time and at any place, but also obtain current road conditions of any road at any time and at any place. To further enrich functions of navigation APPs, many current navigation APPs can further provide prediction of traffic road conditions of future time. An accurate traffic road condition predicting scheme can not only ease traffic problems and save fuel, but also optimize other people's future traffic development planning. Therefore, road condition prediction is a very important problem in the field of current traffic road condition research. In the prior art, historical road conditions at historical time instants before a current time instant are mainly summarized, and meanwhile it is further possible to consider road conditions at historical time instant before the current time instant as features, and add features such as road length, speed limit levels and current time instant thereto, then put them into a Graident Boosting Decision Tree (GBDT) model for training; and predict road conditions at a future time instant according to the trained GBDT model.

However, current road condition prediction schemes only analyze road conditions at historical time instants, predict the road conditions at future time instants through historical data, and cause a lower accuracy of road condition prediction.

SUMMARY OF THE DISCLOSURE

The present disclosure provides a road condition predicting method and apparatus, a computer device and a readable medium, to improve the accuracy of road condition prediction.

The present disclosure provides a road condition predicting method, comprising:

obtaining N-order neighboring roads of a target road in a road network;

respectively obtaining feature information of the target road at a current time instant and feature information of N-order neighboring roads of the target road, the feature information including road conditions at the current time instant and road conditions at at least one historical time instant;

predicting road conditions of the target road at a preset future time instant according to the feature information of the target road at the current time instant, the feature information of the N-order neighboring roads of the target road and a pre-trained road condition predicting model.

Further optionally, in the above-mentioned method, before predicting road conditions of the target road at a preset future time instant according to the feature information of the target road at the current time instant, the feature information of the N-order neighboring roads of the target road and a pre-trained road condition predicting model, the method further comprises:

collecting training data of several training roads to generate a training database; respective training data comprise training feature information of a training road at a training time instant, training feature information of N-order neighboring roads of the training road and actual road conditions of the training road at a preset future time instant;

training the road condition predicting model according to training data of training roads in the training database.

Further optionally, in the above-mentioned method, the training the road condition predicting model according to training data of training roads in the training database specifically comprises:

inputting respective training data in the training database in turn to the road condition predicting model so that the road condition predicting model outputs corresponding predicted road conditions of the training road at a future time instant;

according to actual road conditions and predicted road conditions in the training data, adjusting parameters of the road condition predicting model so that the predicted road conditions of the training road at the future time instant as predicted by the road condition predicting model are close to the corresponding actual road conditions;

repeating use of respective training data to train the road condition predicting model by using the above steps until the predicted road conditions of the road condition predicting model are infinitely approximate to the corresponding actual road conditions, determining parameters of the road condition predicting model and thereby determining the road condition predicting model.

Further optionally, in the above-mentioned method, the road condition predicting mode includes a Convolution Neural Network model and a Recurrent Neural Network model.

Further optionally, in the above-mentioned method, the feature information further comprises at least one of the following features: a road length, which day of the week to which the current time instant belongs, which preset minute time length in one day to which the current time instant belongs to, a speed limit level of the road, a road identification, a road out-degree and in-degree.

The present disclosure provides a road condition predicting apparatus, comprising:

a road obtaining module configured to obtain N-order neighboring roads of a target road in a road network;

a feature information obtaining module configured to respectively obtain feature information of the target road at a current time instant and feature information of N-order neighboring roads of the target road, the feature information including road conditions at the current time instant and road conditions at at least one historical time instant;

a predicting module configured to predict road conditions of the target road at a preset future time instant according to the feature information of the target road at the current time instant, the feature information of the N-order neighboring roads of the target road and a pre-trained road condition predicting model.

Further optionally, the road condition predicting apparatus further comprises:

a collecting module configured to collect training data of several training roads to generate a training database; respective training data comprise training feature information of a training road at a training time instant, training feature information of N-order neighboring roads of the training road and actual road conditions of the training road at a preset future time instant;

a training module configured to train the road condition predicting model according to training data of training roads in the training database.

Further optionally, in the aforesaid apparatus, the training module is specifically configured to:

input respective training data in the training database in turn to the road condition predicting model so that the road condition predicting model outputs corresponding predicted road conditions of the training road at a future time instant;

according to actual road conditions and predicted road conditions in the training data, adjust parameters of the road condition predicting model so that the predicted road conditions of the training road at the future time instant as predicted by the road condition predicting model are close to the corresponding actual road conditions;

repeat use of respective training data to train the road condition predicting model by using the above steps until the predicted road conditions of the road condition predicting model are infinitely approximate to the corresponding actual road conditions, determine parameters of the road condition predicting model and thereby determine the road condition predicting model.

Further optionally, in the aforesaid apparatus, the road condition predicting mode includes a Convolution Neural Network model and a Recurrent Neural Network model.

Further optionally, in the aforesaid apparatus, the feature information further comprises at least one of the following features: a road length, which day of the week to which the current time instant belongs, which preset minute time length in one day to which the current time instant belongs to, a speed limit level of the road, a road identification, a road out-degree and in-degree.

The present disclosure further provides a computer device, comprising:

one or more processors, a memory for storing one or more programs, the one or more programs, when executed by said one or more processors, enabling said one or more processors to implement the aforesaid road condition predicting method.

The present disclosure further provides a computer readable medium on which a computer program is stored, the program, when executed by the processor, implementing the aforesaid road condition predicting method.

According to the road condition predicting method and apparatus, the computer device and the readable medium of the present disclosure, the N-order neighboring roads of the target road are obtained from the road network; feature information of the target road at the current time instant and feature information of N-order neighboring roads of the target road are respectively obtained; road conditions of the target road at a preset future time instant are predicted according to the feature information of the target road at the current time instant, the feature information of the N-order neighboring roads of the target road and the pre-trained road condition predicting model. According to the technical solution of the present embodiment, since the feature information of the N-order neighboring roads of the target road is referred to upon prediction, that is, upon prediction, reference is made not only to the road conditions of the target road at the current time instant and the road conditions at at least one historical time instant, but also to spatial information of the target road, namely, to the road condition of the N-order neighboring roads of the target road at the current time instant and the road conditions at at least one historical time instant, thereby more accurately predicting road conditions of the target road at a future time instant.

BRIEF DESCRIPTION OF DRAWINGS

FIG. 7 is a contrastive diagram of a misreport rate of the road condition predicting method of the present disclosure and a road condition predicting method in the prior art.

FIG. 8 is a table corresponding to FIG. 7.

FIG. 9 is a block diagram of a first embodiment of a road condition predicting apparatus according to the present disclosure.

DETAILED DESCRIPTION OF PREFERRED EMBODIMENTS

The present disclosure will be described in detail in conjunction with figures and specific embodiments to make objectives, technical solutions and advantages of the present disclosure more apparent.

In current navigation applications, a road network may be generated according to actual road distribution, and navigation information may be provided to the user more conveniently according to the road network. To clearly show road conditions of each road in the road network, different colors may be employed to represent road conditions, for example, green, yellow, red and deep red may be used to represent road conditions. For example, it is possible to set multiple speed thresholds to identify road conditions. When an average travel speed of a vehicle on a certain road is larger than or equal to a first speed threshold, it may be believed that the travel is smooth on this road, whereupon green may be used to identify the road condition of the road as smooth travel; when an average travel speed of the vehicle on the road is larger than or equal to a second speed threshold and less than the first speed threshold, it may be believed that the travel is slow on this road, whereupon yellow may be used to identify the road condition of the road as slow travel; when an average travel speed of the vehicle on the road is larger than or equal to a third speed threshold and less than the second speed threshold, it may be believed that the travel speed is slower on this road and congestion occurs, whereupon red may be used to identify the road condition of the road as a congestion state; when an average travel speed of the vehicle on the road is less than the third speed threshold, it may be believed that the travel speed is very slow on this road and serious congestion occurs, whereupon deep red may be used to identify the road condition of the road as a serious congestion state. Using four colors to identify four states of the road as stated above is a preferred solution. In practical application, it is feasible to use more colors or employ other manners to identify road conditions. The average travel speed of the vehicle on the road may be obtained by averaging travel speeds of all vehicles traveling in the direction on the road. Additionally, it needs to be appreciated that road conditions in two directions on road with two travel directions need to be identified as road condition of an independent road respectively.

Figure 1:
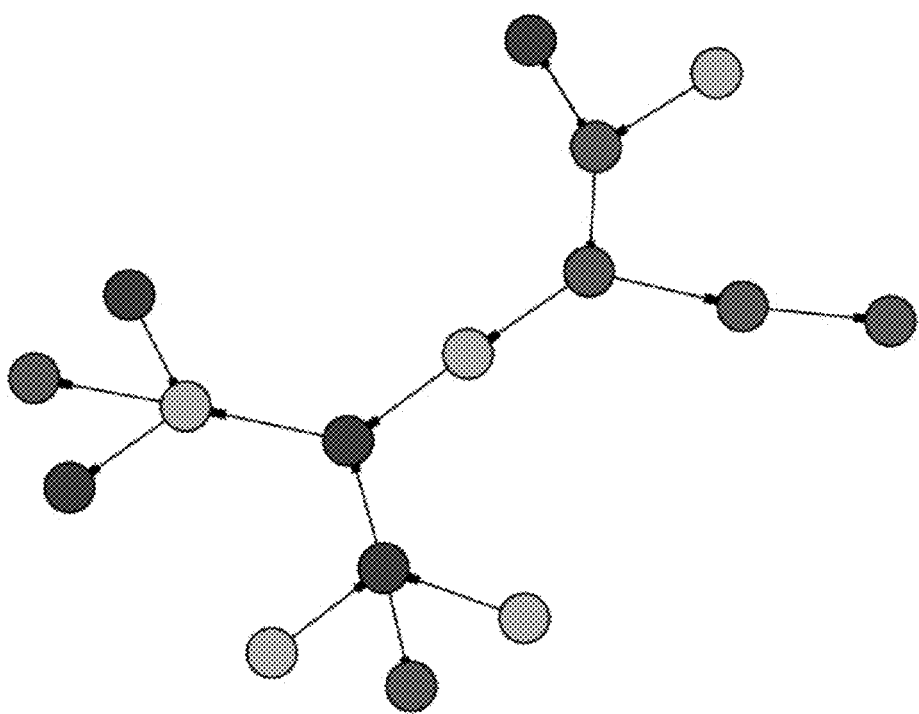
FIG. 1 is a road condition information diagram of all roads in a region at a certain time instant according to the present disclosure.
Figure 2:
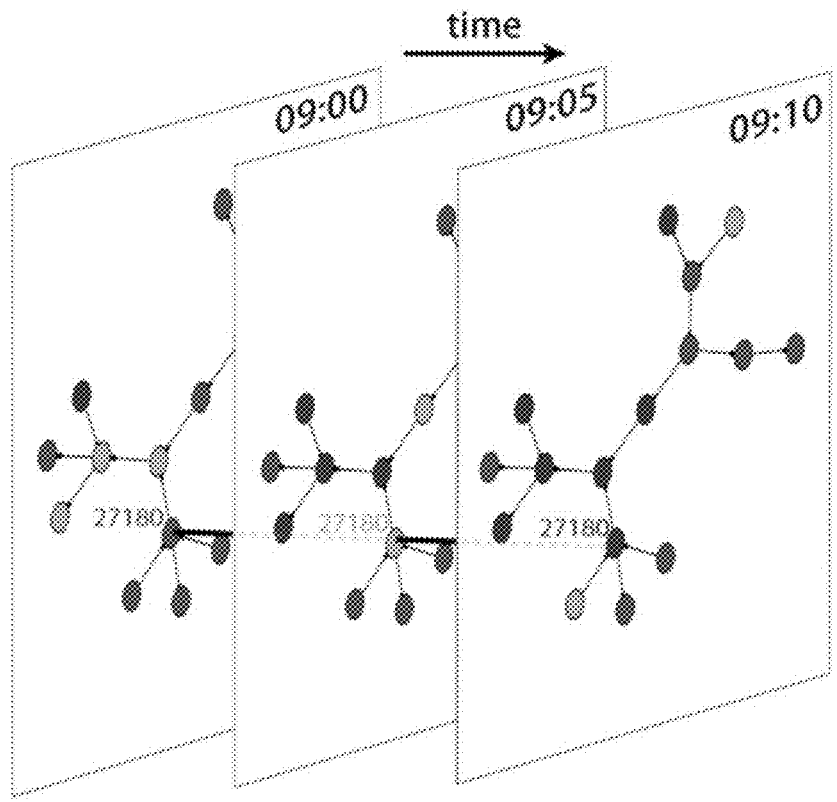
FIG. 2 is a folded road condition diagram of adding a time sequence in the region shown in FIG. 1.

FIG. 1 is a road condition information diagram of all roads in a region at a certain time instant according to the present disclosure. FIG. 2 is a folded road condition diagram of adding a time sequence in the region shown in FIG. 1. As shown in FIG. 1, each round dot represents a road, and connection between dots represents a connectional relationship between roads in the road network. Each round dot in FIG. 1 uses a color of different shades to represent road conditions. In practical application, it is further feasible to use different colors such as the above-mentioned green, yellow, read and deep red to represent road conditions. However, as time shifts, road conditions of each road change as shown in FIG. 2. In the prior art, it is feasible to analyze road conditions of each road at historical time instants to predict road conditions of the road at a future time instant such as 15 minutes, 30 minutes, 45 minutes or 60 minutes after the current time instant. However, it may be known from FIG. 2 that road conditions of each road is not only related to historical data of the road, but also to "spatial information" such as states of neighboring roads around the road. In the prior art, only the historical data of the road at historical time instants are taken into consideration to predict road conditions at a future time instant, so an undesirable accuracy of road condition prediction is caused.

Based on this technical problem, the road condition predicting scheme of the present disclosure introduces neighboring roads of a target road to be predicted, and refers to the neighboring roads to predict road conditions of the target road at a future time instant to increase the accuracy of road condition prediction. Reference may be made to the following depictions of embodiments for details.

Figure 3:
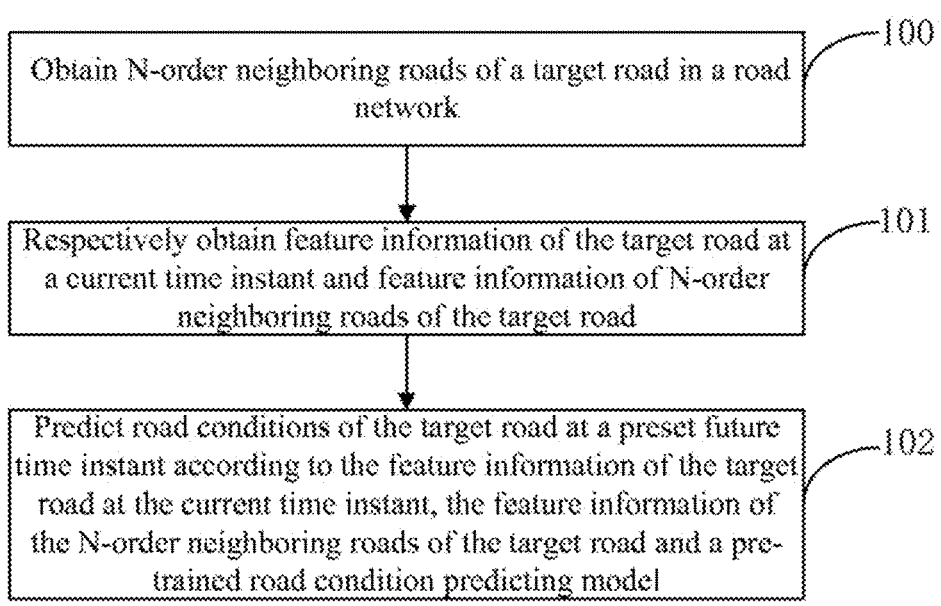
FIG. 3 is a flow chart of a first embodiment of a road condition predicting method according to the present disclosure.

FIG. 3 is a flow chart of a first embodiment of a road condition predicting method according to the present disclosure. As shown in FIG. 3, the road condition predicting method according to the present embodiment may specifically include the following steps:

100: obtaining N-order neighboring roads of the target road in the road network;

A subject for executing the road condition predicting method according to the present embodiment is a road condition predicting apparatus which may be a physical electronic apparatus or an apparatus integrated with software.

The target road of the present embodiment is a road whose road conditions at a future time instant need to be predicted.

The road network according to the present embodiment is a road network built in advance according to actual road distribution. To facilitate identifying each road, a road identification such as road ID may be used in the road network to identify the road. Hence, in the present embodiment, the N-order neighboring roads of the target road obtained from the road network may also be represented with road IDs.

Figure 4:
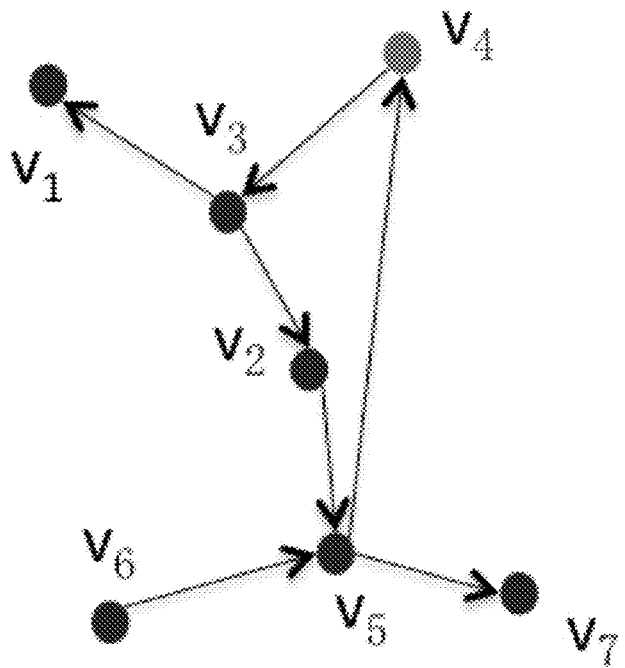
FIG. 4 is a road condition information diagram of all roads in a target region at a certain time instant according to the present disclosure.

In the present embodiment, N-order neighboring roads of the target road are roads which are within a certain range around the target road and can enter the target road, or roads that are accessible from the target road. For example, $1^{st}$-order neighboring roads of the target road may include roads that are upstream of the target road and can directly enter the target road, and may be named $1^{st}$-order upstream slot roads; and roads that are downstream of the target road and may directly go out from the target road, and may be named $1^{st}$-order downstream slot roads. FIG. 4 is a road condition information diagram of all roads in a target region at a certain time instant according to the present disclosure. If the target road is V4, at this time the $1^{st}$-order neighboring roads corresponding to the target road V4 include a neighboring road V5 that is upstream of the target road V4 and enters the target road V4, and a neighboring road V3 that is downstream of the target road V4 and accessible from the target road V4. In practical application, the number of the $1^{st}$-order neighboring roads upstream of the target road may be the same as or different from the number of the $1^{st}$-order neighboring roads downstream of the target road.

In addition, $2^{nd}$-order neighboring roads of the target road are roads that can enter the $1^{st}$-order neighboring roads of the target road or can be accessible from the $1^{st}$-order neighboring roads of the target road. Therefore, the $2^{nd}$-order neighboring roads of the target road include roads that are upstream of the $1^{st}$-order neighboring road of the target road and can directly enter the $1^{st}$-order neighboring road of the target road, and may be named $2^{nd}$-order upstream slots; and roads that are downstream the $1^{st}$-order neighboring road of the target road and may directly go out from the $1^{st}$-order neighboring road of the target road, and may be named $2^{nd}$-order downstream slots. As shown in FIG. 4, the upstream of the target road V4 may include $2^{nd}$-order neighboring roads V2 and V6; the downstream of the target road V4 may include $2^{nd}$-order neighboring roads V1 and V2. In the above manner, as for any target road, it is possible to obtain $3^{rd}$-order neighboring roads, $4^{th}$-order neighboring roads, $5^{th}$-order neighboring roads and the like of the target road in a similar manner. That is to say, it is feasible to obtain $3^{rd}$-order upstream slot roads and $3^{rd}$-order downstream slot roads, $4^{th}$-order upstream slot roads and $4^{th}$-order downstream slot roads, and $5^{th}$-order upstream slot roads and $5^{th}$-order downstream slot roads and the like. Upon road condition prediction, a specific value of N in the N-order neighboring roads of the target road obtained from the road network may be selected according to actual demands, for example, N may be equal to 3, or N may be equal to 5. In practical application, N may further take other integer values. Furthermore, as known from the above, the N-order neighboring roads of the target road may be classified into two portions, namely, upstream N-order neighboring roads and downstream N-order neighboring roads. Furthermore, the number of the upstream N-order neighboring roads in the N-order neighboring roads of the target road may be same as or different from the number of the downstream N-order neighboring roads. Furthermore, regarding each order of neighboring roads, the number of the corresponding upstream neighboring roads may be same as or different from the number of the downstream neighboring roads.

101: respectively obtaining feature information of the target road at a current time instant and feature information of N-order neighboring roads of the target road.

The feature information in the present embodiment comprises road conditions at the current time instant and road conditions at at least one historical time instant; the road conditions at the current time instant and the road conditions at at least one historical time instant both belong to dynamic feature information of the road. That is, the feature information of the target road at the current time instant at least comprises dynamic feature information of the target road, and the dynamic feature information of the target road comprises road conditions of the target road at the current time instant and the road conditions of the target road at at least one historical time instant; for example, the road conditions at the at least one historical time instant may include road conditions of the target road in the past five minutes, past 10 minutes, past 15 minutes . . . until past 120 minutes with an interval of five minutes. In practical application, the historical time instant may be, according to actual demands, the same time instant of the past one day, the same time instant of the past two days, even the same time instant of the past one month or the like, or the same time instant of the past one week, the same time instant of the past two weeks, even the same time instant of the past one year or the like. In other words, the historical time instant is selected as some past time instants which are of reference value for prediction of road conditions at a future time instant and may be specifically selected according to actual needs. For example, when road conditions are classified into four levels, numerical numbers 1, 2, 3 and 4 may be respectively used to represent the road condition at the current time instant or road conditions at the historical time instant.

Correspondingly, the feature information of the N-order neighboring roads of the target road at least includes the dynamic feature information of the N-order neighboring roads of the target road, and dynamic feature information of the N-order neighboring roads of the target road includes road conditions of the N-order neighboring roads of the target road at the current time instant and road conditions of the N-order neighboring roads of the target road at the at least one historical time instant. The dynamic feature information each of each order of neighboring roads of the target road may be represented in a manner similar to the dynamic feature information of the above target road.

Further optionally, the feature information further comprises at least one feature of the following: a road length, which day of the week to which the current time instant belongs, which preset minute time length in one day to which the current time instant belongs to, a speed limit level of the road, a road identification, a road out-degree and in-degree. The road length, which day of the week to which the current time instant belongs, which preset minute time length in one day to which the current time instant belongs to, speed limit level of the road, road identification, road out-degree and in-degree all belong to static feature information of the road. That is, the feature information of the target road may further include the static feature information of the target road. The static feature information of the target road includes at least one of the following features: a length of the target road, which day of the week to which the current time instant belongs, which preset minute time length in one day to which the current time instant belongs to, a speed limit level of the target road, a target road identification, target road out-degree and in-degree. The preset minute time length may be five minutes or 10 minutes, or other minutes. For example, if the preset minute time length is five minutes, which preset minute time length in one day to which the current time instant belongs to may be which 5 minutes in the day to which the current time instant belongs to. The target road out-degree is the number of road accessible from the target road, namely, the number of 1-order neighboring roads downstream of the target road; the target road in-degree is the number of roads that are upstream of the target road and can directly enter the target road, namely, the number of 1-order neighboring roads upstream of the target road.

Correspondingly, the feature information of the N-order neighboring roads of the target road further includes static feature information of the N-order neighboring roads of the target road, and the static feature information of the N-order neighboring roads of the target road includes at least one of the following features: a length of the N-order neighboring road of the target road, which day of the week to which the current time instant belongs, which 5 minutes in the day to which the current time instant belongs to, a speed limit level of the N-order neighboring roads of the target road, a target road identification, and an out-degree and in-degree of the N-order neighboring roads of the target road. Likewise, the target road out-degree of each N-order neighboring road of the target road is the number of roads which are downstream of the N-order neighboring roads of the target road and are accessible from the N-order neighboring roads of the target road, namely, the number of N+1th-order neighboring roads downstream of the N-order neighboring roads of the target road; the in-degree of the N-order neighboring roads of the target road is the number of roads which are upstream of the N-order neighboring roads of the target road and can directly enter the N-order neighboring roads of the target road, namely, the number of N+1th-order neighboring roads upstream of the N-order neighboring roads of the target road.

In the above manner may be obtained the feature information of the target road and the feature information of the N-order neighboring roads of the target road. For example, the feature information of a certain target road may be represented in the following manner:

$$v = \begin{bmatrix} \overset{dynamic}{[\text{current}, preMin5 \ldots preMin120]}, \\ \overset{static}{[\text{length}, \text{weekday}, \text{current\_min}, ID, \text{limit\_level}, \text{degree}]} \end{bmatrix}$$

The feature information V of the target road is divided into two portions. A dynamic portion represents a dynamic feature information portion of the target road, wherein current represents the road conditions of the target road at the current time instant, PreMin5 Represents the road conditions of the target road at a time instant of the past 5 minutes, and preMin120 represents the road conditions of the target road at a time instant of the past 120 minutes; various road conditions may be respectively identified with numerical numbers. For example, road conditions represented by green, yellow, red and deep red in a navigation application may be identified with numerical numbers 1, 2, 3 or 4 respectively. A static portion represents a static feature information portion of the target road, wherein length represents a length of the target road, weekday represents which day of the week to which the current time instant belongs, current_min represents which 5 minutes in the day to which the current time instant belongs to, ID represents the target road identification, limit_level represents a limit speed level of the target road, and degree represents the out-degree and in-degree of the target road; the out-degree and in-degree of the target road are respectively independent feature information, namely, there are feature values with two degrees. The dynamic portion and static portion in the present embodiment jointly form the feature information of the target road, and the feature information of the target road may be represented in the form of a vector in actual use.

102: predicting road conditions of the target road at a preset future time instant according to the feature information of the target road at the current time instant, the feature information of the N-order neighboring roads of the target road and the pre-trained road condition predicting model.

In the present embodiment, when the road conditions of the target road at the preset future time instant is predicted according to the road condition predicting model, two portions of information needs to be input to the pre-trained road condition predicting model: one portion is the feature information of the target road at the current time instant, and the other portion is the feature information of the N-order neighboring roads of the target road. Upon prediction, the feature information of the N-order neighboring roads upstream of the target road in the feature information of the N-order neighboring roads of the target road serves as one group, and the feature information of the N-order neighboring roads downstream the target road serves as another group, and the two groups participate in prediction of road conditions of the target road at the preset future time instant. The future time instant of the present embodiment, according to actual needs, may be a time instant 15 minutes, 30 minutes, 45 minutes or 60 minutes after the current time instant. Other future time instants may also be selected according to actual needs. As for each future time instant, a network model parameter regarding the future time instant in the pre-trained road condition predicting model is different. That is to say, as for the road condition prediction in future 15 minutes, 30 minutes, 45 minutes or 60 minutes, the network model parameter about the future time instant in the road condition predicting model is different, but remaining network model parameters may be shared.

Upon prediction, the feature information of the target road at the current time instant may be represented with a vector, and the corresponding feature information of each order of neighboring roads of the target road may also be identified with a vector, whereupon dimensionality of the vector employed by the feature information of the target road at the current time instant is the same as that of the vector employed by the feature information employed by each order of neighboring roads of the target road at the current time instant; namely, the number of features included by the dynamic feature information portion and the static feature information portion is consistent. In addition, it needs to be appreciated that when the feature information of the target road at the current time instant in the present embodiment is input to the road condition predicting model, a Fully Connect (FC) operation needs to be done first to adjust the dimensionality of the vector of the feature information of the target road at the current time instant.

The road condition predicting model in the present embodiment is obtained by training a road condition predicting model according to several training data in a pre-collected training data library. The road condition predicting model in the present embodiment considers the feature information of the N-order neighboring road of the target road, thereby making the predicted road conditions of the target road at the future time instant more accurate.

According to the road condition predicting method of the present embodiment, the N-order neighboring roads of the target road are obtained from the road network; feature information of the target road at the current time instant and feature information of N-order neighboring roads of the target road are respectively obtained; road conditions of the target road at a preset future time instant are predicted according to the feature information of the target road at the current time instant, the feature information of the N-order neighboring roads of the target road and the pre-trained road condition predicting model. According to the technical solution of the present embodiment, since the feature information of the N-order neighboring roads of the target road is referred to upon prediction, that is, upon prediction, reference is made not only to the road conditions of the target road at the current time instant and the road conditions at at least one historical time instant, but also to spatial information of the target road, namely, to the road condition of the N-order neighboring roads of the target road at the current time instant and the road conditions at at least one historical time instant, thereby more accurately predicting road conditions of the target road at a future time instant.

Figure 5:
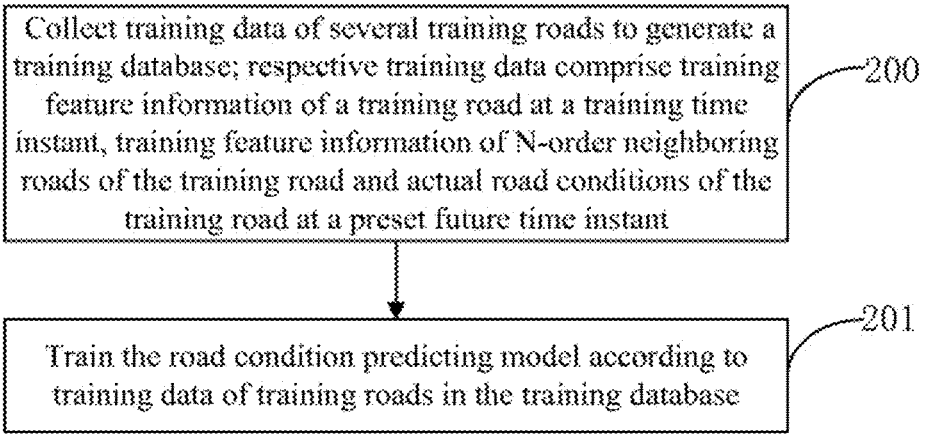
FIG. 5 is a flow chart of a second embodiment of a road condition predicting method according to the present disclosure.

FIG. 5 is a flow chart of a second embodiment of a road condition predicting method according to the present disclosure. As shown in FIG. 5, on the basis of the technical solution of the embodiment shown in FIG. 3, the road condition predicting method according to the present embodiment may specifically further include the following steps before step 102 "predicting road conditions of the target road at a preset future time instant according to the feature information of the target road at the current time instant, the feature information of the N-order neighboring roads of the target road and the pre-trained road condition predicting model":

200: collecting training data of several training roads to generate a training database; wherein respective training data comprise training feature information of the training road at a training time instant, training feature information of N-order neighboring roads of the training road and actual road conditions of the training road at a preset future time instant;

In the present embodiment, it is specifically feasible to obtain training data of multiple training roads obtained from a historical database of a navigation application to generate a training database. In the present embodiment, the training feature information of the selected training road upon training the road condition predicting model may also include a dynamic feature portion and a static feature portion, identical with features included by the aforesaid feature information of the target road at the current time instant. For details, please refer to the depictions of the above embodiment. In addition, it needs to be appreciated that the training time instant of respective training data collected in the present embodiment needs to be distributed at every time instant in a cycle; for example, if a reference cycle is one day, it needs to be ensured that there is training data in each time period of 24 hours of the one day; if the reference cycle is one week, it needs to be ensured that there is training data each day within said one week. In this way can the trained road condition predicting model be ensured as accurate as possible. Certainly, reference needs to be further made to road condition features of each training road. More training data may be collected for a time period with more road condition changes; less training data may be collected for a time period with less road condition changes. To enable effective training for the road condition predicting model, as for each training data, it is further necessary in the present embodiment to obtain, from the historical database, actual road conditions of the training road corresponding to the training data at a preset future time instant. For example, it is feasible to collect, from the historical database, the road conditions of the training road with a road identifier A at 13:00:00 of day X month X year X as 3 (namely, slower), it is further feasible to collect, from the historical database, the road conditions of the training road at 13:15:00 of day X month X year X as 3, the road conditions at 13:30:00 of day X month X year X as 2, the road conditions at 13:45:00 of day X month X year X as 2, and the road conditions at 14:00:00 of day X month X year X as 1, and respectively use them as real road conditions after 15 minutes, 30 minutes, 45 minutes and 60 minutes after 13:00:00 of day X month X year X in the training data.

It needs to be appreciated that the training feature information of the training road included by respective training data may not include the identifier of the training road. As such, when the road conditions of the target road at a future time instant are predicted according to the road condition predicting model, the feature information of the target road at the current time instant and the feature information of the N-order neighboring roads of the target road obtained according to step 101 both may not include the identifier of the target road. At this time, the road condition predicting model does not take into consideration the road identifier upon training. Upon prediction, it is possible to predict road conditions of training roads corresponding to the training data and any road besides the training roads corresponding to the training data at a future time instant; no matter how far or how close a distance between the training road corresponding to the training data upon training and the target road upon prediction is, accurate prediction of the road conditions of the target road at a future time instant can be achieved.

If the training feature information of the training road in training data upon training includes the identifier of the training road, upon prediction the road condition predicting model can only predict the road conditions of a trained road at a future time instant. That is, when the feature information includes an ID of the road, it is necessary to collect IDs of all trained training roads together to generate a training road identifier repository; upon prediction, it is feasible to first judge whether the identifier of the target road is in the training road identifier repository; if yes, predict the road conditions of the target road at a future time instant according to the road condition predicting model; if no, not predict the road conditions of the target road at a future time instant according to the road condition predicting model.

201: training the road condition predicting model according to training data of training roads in the training database.

In the present embodiment, the number of items of training data in the collected training database may be very large, for example, tens of thousands or even hundreds of thousands of items. The larger the number of items of training data collected in training database is, parameters of the road condition predicting model trained by using the training data in the training database are more accurate, namely, the trained road condition predicting model is more accurate, and subsequently, the road conditions of the target road trained according to the road condition predicting model at a future time instant is also more accurate.

After the training database is collected, training data of respective training roads in the training database may be used to train the road condition predicting model. For example, this may specifically include the following steps:

(a1) inputting respective training data in the training database in turn to the road condition predicting model so that the road condition predicting model outputs corresponding predicted road conditions of the training road at a future time instant;

(a2) according to actual road conditions and predicted road conditions in the training data, adjusting parameters of the road condition predicting model so that the predicted road conditions of the training road at the future time instant as predicted by the road condition predicting model are close to corresponding actual road conditions;

(a3) repeating use of respective training data to train the road condition predicting model by using the above steps (a1)-(a2) until the predicted road conditions of the road condition predicting model are infinitely approximate to corresponding actual road conditions, determining parameters of the road condition predicting model and thereby determining the road condition predicting model.

In the present embodiment, before the road condition predicting model is trained, the parameters of the road condition predicting model are all set with an initial value. When the first item of training data is input to the road condition predicting model, the road condition predicting model may, based on the initial parameters, predict the road conditions of the training road corresponding to this item of training data at the future time instant according to the training feature information of the training road at a training time instant in this item of training data and training feature information of N-order neighboring roads of the training road at the training time instant. Since this item of training data includes actual road conditions corresponding to the training road, at this time it is feasible to adjust the parameters of the road condition predicting model according to predicted road conditions and actual road conditions of the training road so that the predicted road conditions at the future time instant as predicted by the road condition predicting model are approximate to corresponding actual road conditions.

Then, the second item of training data is input. Upon training, the second item of training data is trained based on the parameters of the road condition predicting model adjusted after the first item of training data, whereupon the road condition predicting model whose parameters are adjusted may predict road conditions of the training road corresponding to the second item of training data at a future time instant according to the training feature information of the training road at the training time instant in the input second item of training data, and the training feature information of N-order neighboring roads of the training road upon the training time instant. Likewise, since the second item of training data also includes actual road conditions corresponding to the training road, at this time it is feasible to adjust the parameters of the road condition predicting model according to predicted road conditions and actual road conditions of the training road in the second item of training data so that the predicted road conditions at the future time instant as predicted by the road condition predicting model are approximate to corresponding actual road conditions. In a similar manner, it is possible to use the third item of training data, the fourth item of training data, . . . until the last item of training data in turn to train the road condition predicting model. After each item of training data is trained, the parameters of the road condition predicting model are adjusted so that the road conditions predicted by the road condition predicting model are gradually approximate to corresponding actual road conditions. After several items of training data in the training database are trained one round, if the training result is still undesirable, it is further feasible to continue to use several items of training data in the training database to continue next round of training until the road conditions predicted by the road condition predicting model is infinitely approximate to corresponding actual road conditions, whereupon it may be believed that training of the road condition predicting model is completed, and parameters of the road condition predicting model may be determined so that the road condition predicting model is determined.

In addition, the road condition predicting model in the present embodiment may include a Convolution Neural Network (CNN) model and a Recurrent Neural Network (RNN) model. Then, during the training of the road condition predicting model is trained according to the above steps in the present embodiment, it is not only necessary to determine parameters of the CNN model in the road condition predicting model, but also to determine parameters in the RNN model. In addition, it is also necessary to determine network parameters for predicting the road condition at each future time instant.

The CNN model may perform convolution (Conv) processing respectively for the $1^{st}$-order upstream slot roads and $1^{st}$-order downstream slot roads, $2^{nd}$-order upstream slot roads and $2^{nd}$-order downstream slot roads, and $3^{rd}$-order upstream slot roads and $3^{rd}$-order downstream slot roads. The RNN model may perform recurrent processing respectively for the $1^{st}$-order upstream slot roads and $1^{st}$-order downstream slot roads, $2^{nd}$-order upstream slot roads and $2^{nd}$-order downstream slot roads, and $3^{rd}$-order upstream slot roads and $3^{rd}$-order downstream slot roads. When the RNN model performs processing, in the travel direction of the road, an RNN processing result for the $3^{rd}$-order upstream slot roads needs to fed back to RNN processing of the $2^{nd}$-order upstream slot roads, and an RNN processing result for the $2^{nd}$-order upstream slot roads needs to be fed back to the RNN processing of the $1^{st}$-order upstream slot roads, and so on so forth. Likewise, an RNN processing result for the $1^{st}$-order downstream slot roads needs to fed back to RNN processing of the $2^{nd}$-order downstream slot roads, and an RNN processing result for the $2^{nd}$-order downstream slot roads needs to be fed back to the RNN processing of the $3^{rd}$-order downstream slot roads, and so on so forth. As such, the road condition predicting model reasonably refers to the road conditions of N-order neighboring roads around the target road so that the road conditions of the target road at a future time instant as predicted by the road condition predicting model can be made more accurate.

Figure 6:
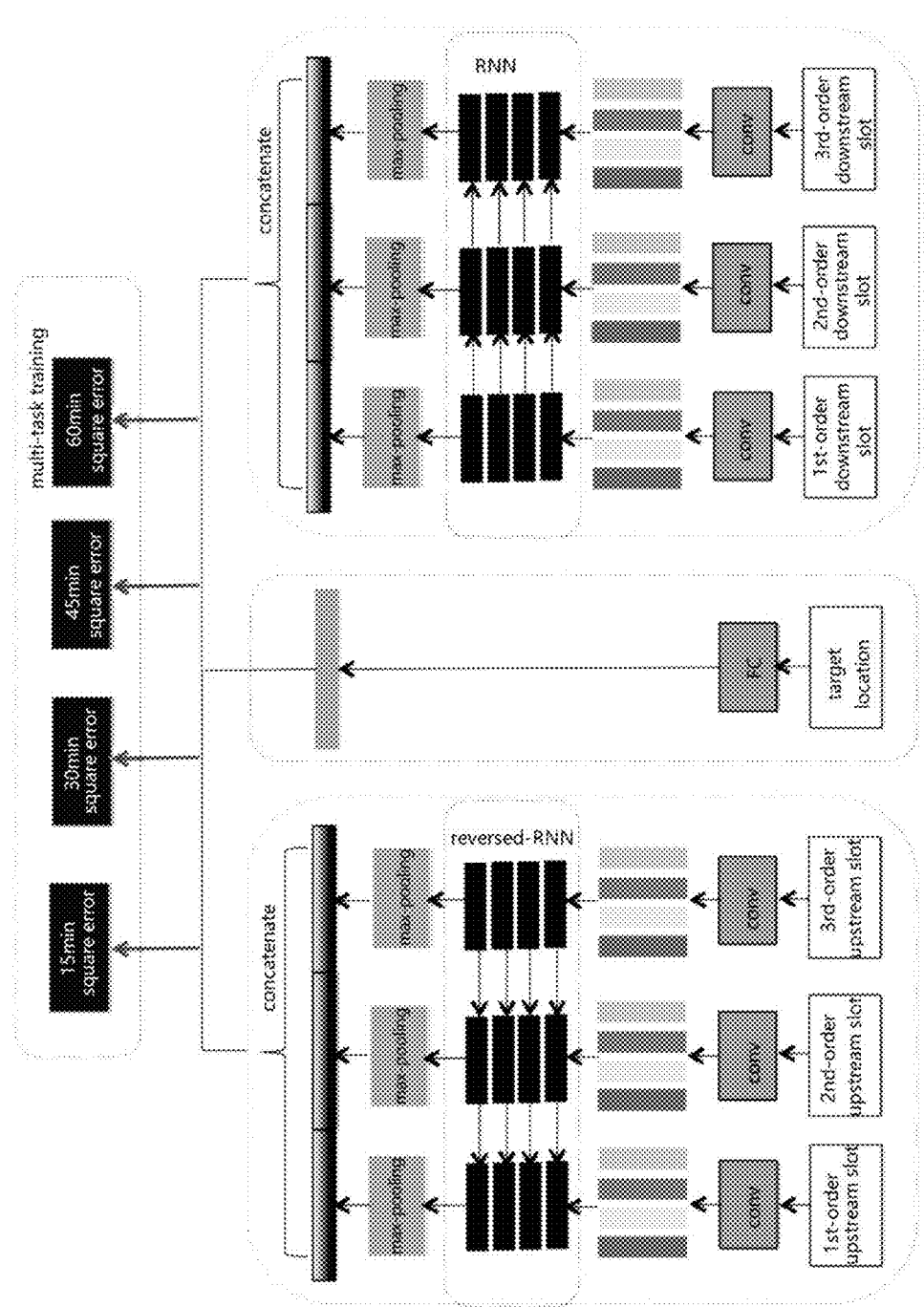
FIG. 6 is a diagram of architecture of a road condition predicting model according to the present disclosure.

FIG. 6 is a diagram of architecture of a road condition predicting model according to the present disclosure. As shown in FIG. 6, in the road condition predicting model of the present embodiment, the target road is identified by Target Location. In the present embodiment, the $3^{rd}$-order neighboring road of the target road is taken as an example to train the road condition predicting model and predict the road conditions of the target road at a future time instant. As shown in FIG. 6, the road condition predicting model may be introduced in four blocks. The three blocks below are respectively, from left to right, a processing block for 3-order neighboring roads upstream of the target road Target Location, a processing block for the target road Target Location, and a processing block for 3-order neighboring roads downstream of the target road Target Location. In the processing block for the 3-order neighboring roads upstream of the target road Target Location, in the present embodiment, 3 CNN models are used to respectively perform Conv processing for the feature information (in the form of a vector) of the upstream $1^{st}$-order neighboring road $1^{st}$-order upstream slot, the upstream $2^{nd}$-order neighboring road $2^{nd}$-order upstream slot and the upstream $3^{rd}$-order neighboring road $3^{rd}$-order upstream slot, and then map each-order neighboring road into a spatial vector via a filter, and then 3 RNN models are respectively used to perform recurrent processing for the mapped spatial vectors corresponding to the upstream $1^{st}$-order neighboring road $1^{st}$-order upstream slot, the upstream $2^{nd}$-order neighboring road $2^{nd}$-order upstream slot and the upstream $3^{rd}$-order neighboring road $3^{rd}$-order upstream slot. In the direction as indicated by the arrows in RNN processing in FIG. 6, an RNN processing result of the $3^{rd}$-order upstream slot road needs to be fed back to the RNN processing of the $2^{nd}$-order upstream slot road, and an RNN processing result of the $2^{nd}$-order upstream slot road needs to be fed back to the RNN processing of the $1^{st}$-order upstream slot road to simulate an actual road travel scenario. After the RNN processing, regarding each-order neighboring road, it is possible to obtain, from each matrix after the RNN processing, a vector exerting a maximum impact in each dimension in a Max-pooling manner to construct a synthetic matrix corresponding to the order of neighboring road; for example, if four 3*3 matrixes are obtained after the RNN processing, upon matrix synthesis, it is necessary to respectively obtain a vector exerting a maximum impact in each dimension in the four matrixes, and then combine vectors exerting the maximum impact in three dimensions to constitute a synthetic matrix. Finally, the synthetic matrix corresponding to the $1^{st}$-order neighboring road, the synthetic matrix corresponding to the $2^{nd}$-order neighboring road and the synthetic matrix corresponding to the $3^{rd}$-order neighboring road are concatenated together as an upstream synthetic matrix upon prediction.

Likewise, in the processing block for 3-order neighboring roads downstream of the target road Target Location, reference may be made to the processing for the upstream 3-order neighboring roads. The only difference lies in that in the direction as indicated by the arrows in RNN processing in FIG. 6, an RNN processing result of the downstream $1^{st}$-order downstream slot road needs to be fed back to the RNN processing of the $2^{nd}$-order downstream slot road, and an RNN processing result of the $2^{nd}$-order downstream slot road needs to be fed back to the RNN processing of the $3^{rd}$-order downstream slot road to simulate an actual road travel scenario. The remaining processing procedure is the same as the upstream, and reference may be made to the above processing of the upstream for details. A final downstream processing may be performed to obtain a downstream synthetic matrix.

In the processing block for the target road Target Location, the FC operation is performed for the feature information of the target road Target Location to obtain a target matrix corresponding to the target road Target Location.

Finally, the prediction at each future time instant further corresponds to a network parameter corresponding to the future time instant. The road conditions corresponding to the prediction time instant may be predicted according to the upstream synthetic matrix, the target matrix, the downstream matrix and the network parameter corresponding to the future time instant. The corresponding road conditions may be represented with a numerical identifier, for example, 1 represents smooth travel, 2 represents slow travel, 3 represents congestion and 4 represents serious congestion. For example, specifically it is feasible to multiply the upstream synthetic matrix, the target matrix, the downstream matrix and the network parameter corresponding to the future time instant to obtain a 1*1 vector, which represents the corresponding road conditions at the future time instant. Regarding the future time instant which is 15 minutes after the current time instant, there is a network parameter corresponding to the future time instant which is 15 minutes after the current time instant; regarding the future time instant which is 30 minutes after the current time instant, there is a network parameter corresponding to the future time instant which is 30 minutes after the current time instant; and so on so forth.

Upon training by using the architecture of the road condition predicting model shown in FIG. 6 and according to the embodiment shown in FIG. 5, it is necessary to determine parameters of each CNN model, parameters of the RNN model, further determine the network parameter corresponding to each future time instant, and thereby determine the whole road condition predicting model. Furthermore, in the network architecture of the road condition predicting model, the CNN models and RNN models in a bottom layer all may share parameters, and only network parameters corresponding to respective future time instants at the top do not share parameters. This may effectively save the learning time of the CNN models and RNN models in the bottom layer in the road condition predicting model and improve the training efficiency.

According to the road condition predicting method of the present embodiment and by using the technical solution of the present embodiment, since reference is made to the feature information of N-order neighboring roads of the target road upon prediction, that is, upon prediction reference is made not only to the road conditions of the target road at the current time instant and the road conditions at at least one historical time instant, but also to spatial information of the target road, namely, to the road condition of the N-order neighboring roads of the target road at the current time instant and the road conditions at at least one historical time instant, thereby more accurately predicting road conditions of the target road at a future time instant.

FIG. 7 is a contrastive diagram of a misreport rate of the road condition predicting method of the present disclosure and a road condition predicting method in the prior art. First, in an index for evaluating the road condition predicting method of the present embodiment is comparing misreport rates of real values, wherein an average misreport rat of respective time instants=a sum of scores of predicted misreport rates of all cases/a reference sum of cases. For example, if a city at a certain time instant includes misreport rates of 30,000 cases, the average misreport rate at this time instant is equal to the sum of scores of the misreport rates of 30,000 cases dividing 30,000. As shown in FIG. 7, a left column at each time instant is baseline, namely, the misreport rate of the current road condition predicting method as stated in Background of the Disclosure, and a right column is the misreport rate of the road condition predicting model of the present disclosure. FIG. 8 is a table corresponding to FIG. 7. As known from FIG. 7 and FIG. 8, a comparison between the road condition predicting model of the present disclosure exhibits that an average prediction accuracy according to the present disclosure may increase by approximately 26% as compared with the baseline. Therefore, the road conditions at a future time instant as predicted by the road condition predicting model according to the present disclosure are more accurate.

FIG. 9 is a block diagram of a first embodiment of a road condition predicting apparatus according to the present disclosure. As shown in FIG. 9, the road condition predicting apparatus according to the present embodiment may specifically include: a road obtaining module 10, a feature information obtaining module 11 and a predicting module 12.

The road obtaining module 10 is configured to obtain N-order neighboring roads of the target road in the road network; the feature information obtaining module 11 is configured to respectively obtain feature information of the target road at a current time instant and feature information of N-order neighboring roads of the target road obtained by the road obtaining module 10, the feature information including the road conditions at the current time instant and road conditions at at least one historical time instant; the predicting module 12 is configured to predict road conditions of the target road at a preset future time instant according to the feature information of the target road at the current time instant and the feature information of the N-order neighboring roads of the target road obtained by the feature information obtaining module 11 and the pre-trained road condition predicting model.

Principles employed by the road condition predicting apparatus of the present embodiment to implement information processing with the above modules and the resultant technical effects are the same as those of the above-mentioned method embodiment. For particulars, please refer to the depictions of the aforesaid relevant method embodiment, and no detailed depictions will be presented here.

Figure 10:
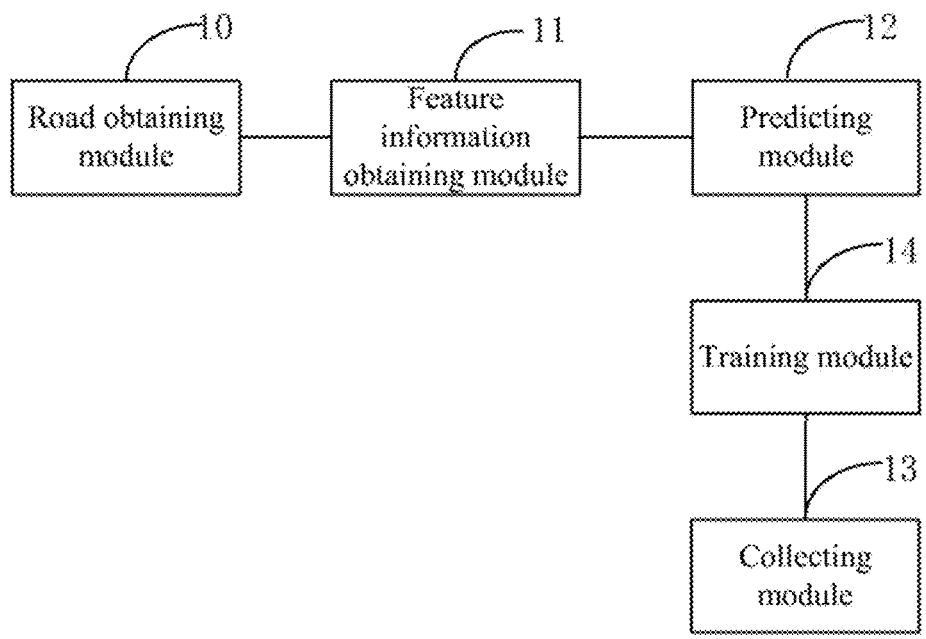
FIG. 10 is a block diagram of a second embodiment of a road condition predicting apparatus according to the present disclosure.

FIG. 10 is a block diagram of a second embodiment of a road condition predicting apparatus according to the present disclosure. As shown in FIG. 10, the present embodiment, on the basis of the technical solution of the embodiment shown in FIG. 9, may further include the following technical solution:

As shown in FIG. 10, the road condition predicting apparatus according to the present embodiment further comprises a collecting module 13 and a training module 14.

The collecting module 13 is configured to collect training data of several training roads to generate a training database; wherein respective training data comprise training feature information of the training road at a training time instant, training feature information of N-order neighboring roads of the training road and actual road conditions of the training road at a preset future time instant; the training module 14 is configured to train the road condition predicting model according to training data of training roads in the training database collected by the collecting module 13.

Correspondingly, the predicting module 12 is configured to predict road conditions of the target road at a preset future time instant according to the feature information of the target road at the current time instant and the feature information of the N-order neighboring roads of the target road obtained by the feature information obtaining module 11 and the road condition predicting model pre-trained by the training module 14.

Further optionally, in the road condition predicting apparatus of the present embodiment, the training module 14 is specifically configured to:

input respective training data in the training database in turn to the road condition predicting model so that the road condition predicting model outputs corresponding predicted road conditions of the training road at a future time instant;

according to actual road conditions and predicted road conditions in the training data, adjust parameters of the road condition predicting model so that the predicted road conditions of the training road at the future time instant as predicted by the road condition predicting model are close to corresponding actual road conditions;

repeat use of respective training data to train the road condition predicting model by using the above steps until the predicted road conditions of the road condition predicting model are infinitely approximate to corresponding actual road conditions, determine parameters of the road condition predicting model and thereby determine the road condition predicting model.

Further optionally, in the road condition predicting apparatus according to the present embodiment, the road condition predicting mode includes a Convolution Neural Network model and a Recurrent Neural Network model.

Further optionally, in the road condition predicting apparatus according to the present embodiment, the feature information further comprises at least one of the following features: a road length, which day of the week to which the current time instant belongs, which preset minute time length in one day to which the current time instant belongs to, a speed limit level of the road, a road identification, a road out-degree and in-degree.

Principles employed by the road condition predicting apparatus of the present embodiment to implement information processing with the above modules and the resultant technical effects are the same as those of the above-mentioned method embodiment. For particulars, please refer to the depictions of the aforesaid relevant method embodiment, and no detailed depictions will be presented here.

Figure 11:
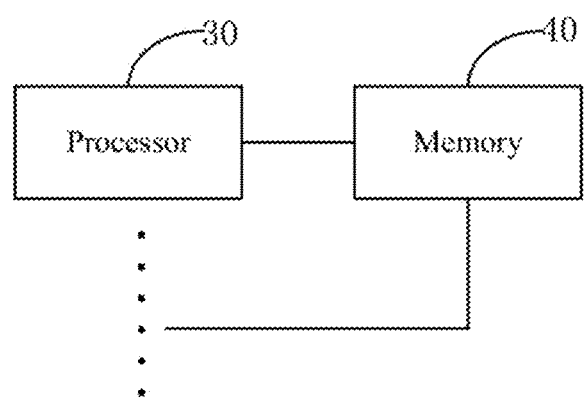
FIG. 11 is a block diagram of an embodiment of a computer device according to the present disclosure.

FIG. 11 is a block diagram of an embodiment of a computer device according to the present disclosure. As shown in FIG. 11, the computer device according to the present embodiment comprises: one or more processors 30, and a memory 40 for storing one or more programs, the one or more programs stored in the memory 40, when executed by said one or more processors 30, enabling said one or more processors 30 to implement the information processing method of the embodiments shown in FIG. 3 and FIG. 5. The embodiment shown in FIG. 11 exemplarily includes a plurality of processors 30.

Figure 12:
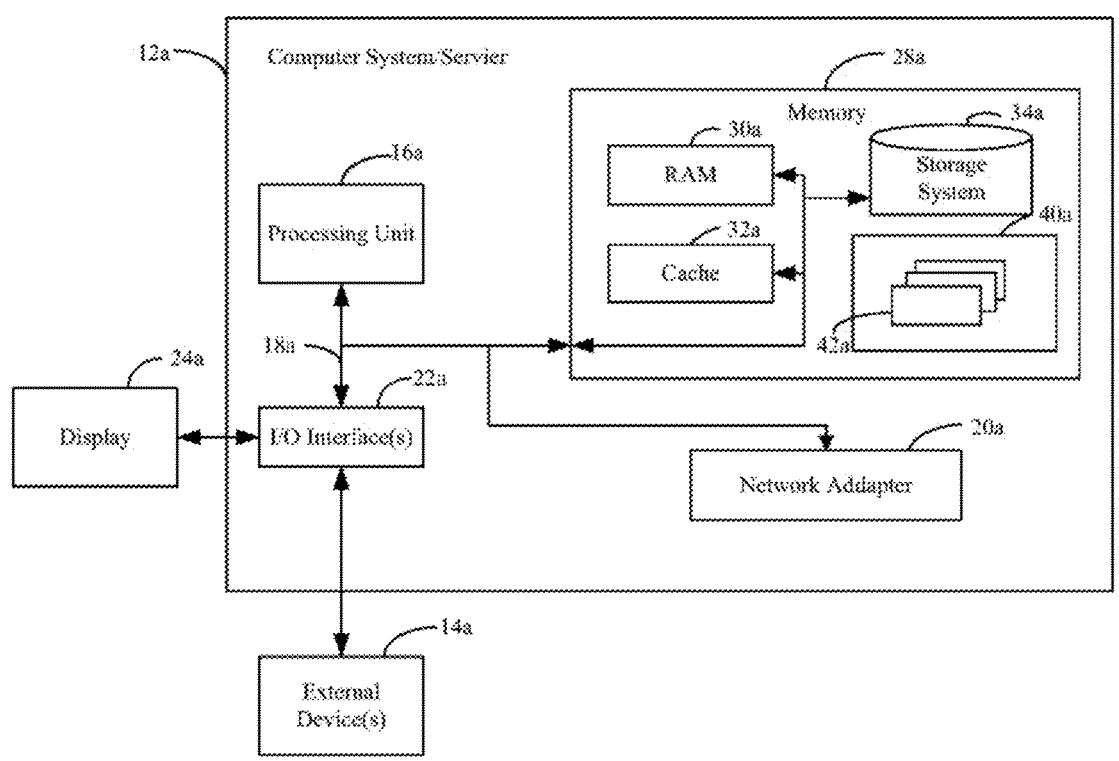
FIG. 12 is an example diagram of a computer device according to an embodiment of the present disclosure.

For example, FIG. 12 is an example diagram of a computer device according to an embodiment of the present disclosure. FIG. 12 shows a block diagram of an example computer device 12a adapted to implement an implementation mode of the present disclosure. The computer device 12a shown in FIG. 12 is only an example and should not bring about any limitation to the function and scope of use of the embodiments of the present disclosure.

As shown in FIG. 12, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 12 and typically called a "hard drive"). Although not shown in FIG. 12, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 3, FIG. 5, FIG. 9 and FIG. 10 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 3, FIG. 5, FIG. 9 and FIG. 10 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 12, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the road condition predicting method shown in the above embodiments.

The present disclosure further provides a computer readable medium on which a computer program is stored, the program, when executed by the processor, implementing the road condition predicting method shown in the above embodiments.

The computer readable medium of the present embodiment may include RAM 30a, and/or cache memory 32a and/or a storage system 34a in the system memory 28a in the embodiment shown in FIG. 12.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A road condition predicting method, wherein the method comprises:

obtaining N-order neighboring roads of a target road in a road network;

respectively obtaining feature information of the target road at a current time instant and feature information of N-order neighboring roads of the target road, the feature information including road conditions at the current time instant and road conditions at at least one historical time instant;

predicting road conditions of the target road at a preset future time instant according to the feature information of the target road at the current time instant, the feature information of the N-order neighboring roads of the target road and a pre-trained road condition predicting model, wherein the pre-trained road condition predicting model is configured for:

performing recurrent processing for each of the N-order neighboring roads after performing convolution processing for each of the N-order neighboring roads;

max-pooling processing for a result of the recurrent processing, so as to constitute a synthetic matrix for each of the N-order neighboring roads;

concatenating synthetic matrixes of upstream neighboring roads of the N-order neighboring roads to obtain an upstream synthetic matrix;

concatenating synthetic matrixes of downstream neighboring roads of the N-order neighboring roads to obtain a downstream synthetic matrix;

processing the feature information of the target road by a Fully Connected (FC) operation, to obtain a target matrix corresponding to the target road; and predicting road conditions of the target road at different future time instants based at least on the upstream synthetic matrix, the downstream synthetic matrix, the target matrix corresponding to the target road, and respective parameters of the different future time instants.

2. The method according to claim 1, wherein before predicting road conditions of the target road at a preset future time instant according to the feature information of the target road at the current time instant, the feature information of the N-order neighboring roads of the target road and a pre-trained road condition predicting model, the method further comprises:
collecting training data of several training roads to generate a training database;
respective training data comprise training feature information of a training road at a training time instant, training feature information of N-order neighboring roads of the training road and actual road conditions of the training road at a preset future time instant;
training the road condition predicting model according to training data of respective training roads in the training database.

3. The method according to claim 2, wherein the training the road condition predicting model according to training data of respective training roads in the training database specifically comprises:
inputting the respective training data in the training database in turn to the road condition predicting model so that the road condition predicting model outputs corresponding predicted road conditions of the training road at a future time instant;
according to actual road conditions and predicted road conditions in the training data, adjusting parameters of the road condition predicting model so that the predicted road conditions of the training road at the future time instant as predicted by the road condition predicting model are close to the corresponding actual road conditions;
repeating use of the respective training data to train the road condition predicting model by using the above steps until the predicted road conditions of the road condition predicting model are infinitely approximate to the corresponding actual road conditions, determining parameters of the road condition predicting model and thereby determining the road condition predicting model.

4. The method according to claim 1, wherein the feature information further comprises at least one of the following features: a road length, which day of the week to which the current time instant belongs, which preset minute time length in one day to which the current time instant belongs, a speed limit level of the road, a road identification, a road out-degree and in-degree.

5. The method according to claim 1, wherein the pre-trained road condition predicting model comprises a Convolution Neural Network (CNN) model and a Recurrent Neural Network (RNN) model, the CNN model performs the convolution processing for each of the N-order neighboring roads, and the RNN model performs the recurrent processing for each of the N-order neighboring roads.

6. A computer device, wherein the device comprises:
one or more processors,
a memory for storing one or more programs,
the one or more programs, when executed by said one or more processors, enabling said one or more processors to implement the following operation:
obtaining N-order neighboring roads of a target road in a road network;
respectively obtaining feature information of the target road at a current time instant and feature information of N-order neighboring roads of the target road, the feature information including road conditions at the current time instant and road conditions at at least one historical time instant;
predicting road conditions of the target road at a preset future time instant according to the feature information of the target road at the current time instant, the feature information of the N-order neighboring roads of the target road and a pre-trained road condition predicting model,
wherein the pre-trained road condition predicting model is configured for:
performing recurrent processing for each of the N-order neighboring roads after performing convolution processing for each of the N-order neighboring roads;
max-pooling processing for a result of the recurrent processing, so as to constitute a synthetic matrix for each of the N-order neighboring roads;
concatenating synthetic matrixes of upstream neighboring roads of the N-order neighboring roads to obtain an upstream synthetic matrix;
concatenating synthetic matrixes of downstream neighboring roads of the N-order neighboring roads to obtain a downstream synthetic matrix;
processing the feature information of the target road by a Fully Connected (FC) operation, to obtain a target matrix corresponding to the target road; and
predicting road conditions of the target road at different future time instants based at least on the upstream synthetic matrix, the downstream synthetic matrix, the target matrix corresponding to the target road, and respective parameters of the different future time instants.

7. The computer device according to claim 6, wherein before predicting road conditions of the target road at a preset future time instant according to the feature information of the target road at the current time instant, the feature information of the N-order neighboring roads of the target road and a pre-trained road condition predicting model, the operation further comprises:
collecting training data of several training roads to generate a training database;
respective training data comprise training feature information of a training road at a training time instant, training feature information of N-order neighboring roads of the training road and actual road conditions of the training road at a preset future time instant;
training the road condition predicting model according to training data of respective training roads in the training database.

8. The computer device according to claim 7, wherein the training the road condition predicting model according to training data of respective training roads in the training database specifically comprises:
inputting the respective training data in the training database in turn to the road condition predicting model so that the road condition predicting model outputs corresponding predicted road conditions of the training road at a future time instant;
according to actual road conditions and predicted road conditions in the training data, adjusting parameters of the road condition predicting model so that the predicted road conditions of the training road at the future time instant as predicted by the road condition predicting model are close to the corresponding actual road conditions;

repeating use of the respective training data to train the road condition predicting model by using the above steps until the predicted road conditions of the road condition predicting model are infinitely approximate to the corresponding actual road conditions, determining parameters of the road condition predicting model and thereby determining the road condition predicting model.

9. The computer device according to claim 6, wherein the feature information further comprises at least one of the following features: a road length, which day of the week to which the current time instant belongs, which preset minute time length in one day to which the current time instant belongs, a speed limit level of the road, a road identification, a road out-degree and in-degree.

10. The computer device according to claim 6, wherein the pre-trained road condition predicting model comprises a Convolution Neural Network (CNN) model and a Recurrent Neural Network (RNN) model, the CNN model performs the convolution processing for each of the N-order neighboring roads, and the RNN model performs the recurrent processing for each of the N-order neighboring roads.

11. A non-transitory computer readable medium on which a computer program is stored, wherein the program, when executed by the processor, implements the following operation:

obtaining N-order neighboring roads of a target road in a road network;

respectively obtaining feature information of the target road at a current time instant and feature information of N-order neighboring roads of the target road, the feature information including road conditions at the current time instant and road conditions at at least one historical time instant;

predicting road conditions of the target road at a preset future time instant according to the feature information of the target road at the current time instant, the feature information of the N-order neighboring roads of the target road and a pre-trained road condition predicting model, wherein the pre-trained road condition predicting model is configured for:

performing recurrent processing for each of the N-order neighboring roads after performing convolution processing for each of the N-order neighboring roads;

max-pooling processing for a result of the recurrent processing, so as to constitute a synthetic matrix for each of the N-order neighboring roads;

concatenating synthetic matrixes of upstream neighboring roads of the N-order neighboring roads to obtain an upstream synthetic matrix;

concatenating synthetic matrixes of downstream neighboring roads of the N-order neighboring roads to obtain a downstream synthetic matrix;

processing the feature information of the target road by a Fully Connected (FC) operation, to obtain a target matrix corresponding to the target road; and predicting road conditions of the target road at different future time instants based at least on the upstream synthetic matrix, the downstream synthetic matrix, the target matrix corresponding to the target road, and respective parameters of the different future time instants.

12. The non-transitory computer readable medium according to claim 11, wherein before predicting road conditions of the target road at a preset future time instant according to the feature information of the target road at the current time instant, the feature information of the N-order neighboring roads of the target road and a pre-trained road condition predicting model, the operation further comprises:

collecting training data of several training roads to generate a training database; respective training data comprise training feature information of a training road at a training time instant, training feature information of N-order neighboring roads of the training road and actual road conditions of the training road at a preset future time instant;

training the road condition predicting model according to training data of respective training roads in the training database.

13. The non-transitory computer readable medium according to claim 12, wherein the training the road condition predicting model according to training data of respective training roads in the training database specifically comprises:

inputting the respective training data in the training database in turn to the road condition predicting model so that the road condition predicting model outputs corresponding predicted road conditions of the training road at a future time instant;

according to actual road conditions and predicted road conditions in the training data, adjusting parameters of the road condition predicting model so that the predicted road conditions of the training road at the future time instant as predicted by the road condition predicting model are close to the corresponding actual road conditions;

repeating use of the respective training data to train the road condition predicting model by using the above steps until the predicted road conditions of the road condition predicting model are infinitely approximate to the corresponding actual road conditions, determining parameters of the road condition predicting model and thereby determining the road condition predicting model.

14. The non-transitory computer readable medium according to claim 11, wherein the feature information further comprises at least one of the following features: a road length, which day of the week to which the current time instant belongs, which preset minute time length in one day to which the current time instant belongs, a speed limit level of the road, a road identification, a road out-degree and in-degree.

15. The non-transitory computer readable medium according to according to claim 11, wherein the pre-trained road condition predicting model comprises a Convolution Neural Network (CNN) model and a Recurrent Neural Network (RNN) model, the CNN model performs the convolution processing for each of the N-order neighboring roads, and the RNN model performs the recurrent processing for each of the N-order neighboring roads.

\* \* \* \* \*